(12) United States Patent
Das et al.

(10) Patent No.: US 12,022,576 B2
(45) Date of Patent: *Jun. 25, 2024

(54) CLOUD-BASED INTERWORKING GATEWAY SERVICE

(71) Applicant: Federated Wireless, Inc., Arlington, VA (US)

(72) Inventors: Deepak Das, Lexington, MA (US); Sepehr Mehrabanzad, Wellesley, MA (US); Arijit Banerjee, Melrose, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/340,263

(22) Filed: Jun. 23, 2023

(65) Prior Publication Data

US 2023/0337330 A1    Oct. 19, 2023

Related U.S. Application Data

(63) Continuation of application No. 16/405,115, filed on May 7, 2019, now Pat. No. 11,729,863.

(Continued)

(51) Int. Cl.
*H04W 88/16* (2009.01)
*H04L 12/46* (2006.01)
(Continued)

(52) U.S. Cl.
CPC ............ *H04W 88/16* (2013.01); *H04L 12/46* (2013.01); *H04W 24/08* (2013.01); *H04W 28/24* (2013.01);
(Continued)

(58) Field of Classification Search
CPC ..... H04W 88/16; H04W 24/08; H04W 28/24; H04W 48/18; H04W 92/02; H04W 92/24;
(Continued)

(56) References Cited

U.S. PATENT DOCUMENTS 8,472,371 B1    6/2013 Bari et al.
2002/0061014 A1    5/2002 Saller
(Continued)

OTHER PUBLICATIONS

M. Skomersic, M. Matijasevic and I. Gojmerac, "Specification and delivery of quality indicators in IP packet exchange networks," 2014 IEEE Globecom Workshops (GC Wkshps), 2014, pp. 618-623, doi: 10.1109/GLOCOMW.2014.7063501. (Year: 2014).

(Continued)

*Primary Examiner* — Ayaz R Sheikh
*Assistant Examiner* — Tarell A Hampton
(74) *Attorney, Agent, or Firm* — FINNEGAN, HENDERSON, FARABOW, GARRETT & DUNNER, LLP

(57) ABSTRACT

The disclosed embodiments provide a method for interconnecting a plurality of networks, including a first network, with a second network via an interworking gateway (IWG). The method may comprise receiving a request from the first network for a user in the first network to access at least one service or application available in the second network, determining at least one criteria associated with the second network to enforce for the user in the first network, and enforcing the at least one criteria for communications associated with the user between the first and second networks. The IWG may be a cloud-based service that is configured to perform the aforementioned steps. The IWG may also be configured to be dynamically scalable to support multiple networks in the plurality of networks requesting interconnection with the second network.

47 Claims, 9 Drawing Sheets

Related U.S. Application Data

(60) Provisional application No. 62/675,359, filed on May 23, 2018.

(51) Int. Cl.
*H04W 24/08* (2009.01)
*H04W 28/24* (2009.01)
*H04W 48/18* (2009.01)
*H04W 92/02* (2009.01)
*H04W 92/24* (2009.01)

(52) U.S. Cl.
CPC ............ *H04W 48/18* (2013.01); *H04W 92/02* (2013.01); *H04W 92/24* (2013.01)

(58) Field of Classification Search
CPC .... H04W 92/04; H04L 12/46; H04L 41/5012; H04L 67/02; H04L 65/1036; H04L 65/1069
See application file for complete search history.

(56) References Cited

U.S. PATENT DOCUMENTS

| | | |
|---|---|---|
| 2002/0151312 A1 | 10/2002 | Bos et al. |
| 2006/0141995 A1 | 6/2006 | Purnadi et al. |
| 2006/0218302 A1 | 9/2006 | Chia et al. |
| 2006/0256748 A1 | 11/2006 | Jung et al. |
| 2007/0093202 A1 | 4/2007 | Hwang et al. |
| 2008/0235048 A1 | 9/2008 | Rantanen et al. |
| 2008/0293409 A1 | 11/2008 | Gillot et al. |
| 2008/0299911 A1 | 12/2008 | Chen et al. |
| 2010/0183020 A1 | 7/2010 | Yin et al. |
| 2011/0044245 A1 | 2/2011 | Hasegawa et al. |
| 2012/0034916 A1 | 2/2012 | Hu et al. |
| 2012/0218924 A1 | 8/2012 | Bhalla |
| 2013/0225123 A1 | 8/2013 | Adjakple et al. |
| 2014/0357219 A1 | 12/2014 | Nicolaescu et al. |
| 2014/0362807 A1 | 12/2014 | Bhatnagar et al. |
| 2015/0026352 A1* | 1/2015 | De Foy ................. H04L 67/141 709/228 |
| 2015/0065125 A1 | 3/2015 | Patel et al. |
| 2015/0244537 A1 | 8/2015 | Paquette et al. |
| 2016/0198378 A1 | 7/2016 | Huber et al. |
| 2017/0188223 A1 | 6/2017 | Gundavelli et al. |
| 2019/0037398 A1 | 1/2019 | Eriksson et al. |
| 2019/0053300 A1 | 2/2019 | Kaliaperumal |
| 2019/0200232 A1 | 6/2019 | He |
| 2020/0267542 A1 | 8/2020 | Pronk |

OTHER PUBLICATIONS

G. Boulmier, "Non-intentional mobility of data sessions across mobile networks while roaming because of operators' mobile DNS architecture," 2016 17th International Telecommunications Network Strategy and Planning Symposium (Networks), 2016, pp. 89-94 , (Year: 2016).

S. Mohan and N. Agarwal, "A convergent framework for QoS-driven social media content delivery over mobile networks," 2011 2nd International Conference on Wireless Communication, Vehicular Technology, Information Theory and Aerospace & Electronic Systems Technology (Wireless VITAE), 2011, pp. 1-7 (Year: 2011).

J. Hwang, N. Kim, T. Jeong and J. Koh, "A Framework for IM Interworking with Heterogeneous Networks," 2009 Fifth International Conference on Networking and Services, 2009, pp. 426-431, (Year: 2009).

* cited by examiner

CLOUD-BASED INTERWORKING GATEWAY SERVICE

RELATED APPLICATIONS

This application is a continuation of U.S. application Ser. No. 16/405,115, filed May 7, 2019, which claims the benefit of U.S. Provisional Application No. 62/675,359, filed May 23, 2018, entitled "A Cloud-Based Interworking Gateway Service," which is hereby incorporated by reference in its entirety.

TECHNICAL FIELD

The disclosed embodiments generally relate to an interworking gateway service and, more particularly, to systems and methods for providing interworking gateway functionality as a service in a cloud-based system to interconnect a large number of networks in a flexible and scalable manner.

BACKGROUND

An interworking gateway (IWG) is conventionally used to interconnect large networks to each other. The IWG may provide functionality that allows users of a first network to access certain services and network connectivity in a second network. For example, IWG functionality is often used to interconnect different Mobile Network Operators (MNOs), such as Verizon, AT&T, and the like, to provide access to various user services, such as roaming services, across their respective MNO networks.

IWG functions are typically implemented by one or more Internetwork Packet Exchanges (IPXs). In operation, users (e.g., customers or subscribers) of a first MNO may access resources of a second MNO through an IPX, which is configured to enforce the first MNO's respective policies and procedures for network management, authentication, authorization, accounting, security, billing, service level agreements (SLAs), and quality of service (QoS), among other things, even as the user is accessing network resources of the second MNO. For instance, an IPX may enforce a first MNO's policies for authenticating and billing users of that MNO that are "roaming" on a second MNO's network. The IPX also may ensure that a user of the first MNO accessing network resources in the second MNO's network remains compliant with the same SLA requirements that the user would be subject to in the first MNO, such as for example any restrictions on available bandwidth, prioritization, or other performance metrics.

Because conventional IWG solutions (such as IPXs) are used to connect relatively few large networks, such as MNO networks, they are not further configured to interconnect a large number of networks, e.g., such as hundreds or thousands of networks. A conventional IPX, for example, is typically a server or cluster of servers that supports 3-5 connections to MNO networks at a time using well-defined network interfaces and protocols, such as the Diameter or RADIUS protocol. Accordingly, when an IPX is used to provide roaming services to users of wireless user equipment, the total number of MNO networks to which a user can roam within the United States does not exceed a relatively small number of networks; the IPX, therefore, does not need to be configured to support hundreds or thousands of different networks.

In 2015, the Federal Communications Commission (FCC) established a Citizens Broadband Radio Service (CBRS) for shared spectrum access in the 3.5 GHz band (3550-3700 MHz). With the recent availability of CBRS access networks, there may be a significant increase in the number of 3.5 GHz based networks deployed in the United States. The management and allocation of shared spectrum in the 3.5 GHz band may be subject to certain rules enforced by a Spectrum Access System (SAS). One such SAS is described in more detail, for example, in U.S. application Ser. No. 14/559,614, entitled "Computerized methods and apparatus for spectrum access," filed Dec. 3, 2014 and assigned to Federated Wireless, Inc., which is hereby incorporated by reference in its entirety. Thousands of new 3.5 GHz based networks are expected to be created, for example, to support Long Term Evolution (LTE) networks.

In this context, a "network" comprises two or more interconnected network nodes including, for example, one or more computers, servers, laptops, smartphones, tablets, user equipment, base stations, access points, routers, switches, gateways, or any other portable or fixed devices, configured to communicate with at least one other network node on the network. A network may be a local area network, wide area network, private network, public network, etc., and may consist of a permanent or temporary configuration of interconnected nodes. For example, a network may be temporarily created for a particular event, such as for a county fair or a sporting event. A network may be an "enterprise" network managed by a single entity, such as a corporation, non-profit, governmental agency, or other organization. Two or more networks may be "interconnected" when a user from one network can access resources such as, for example, services, applications, spectrum, computing, or other resources, from another network. An "edge" or "gateway" network node may provide an entry point into a network, and an edge network may be used to interconnect an IWG with at least one edge node in an adjacent network.

As the number of 3.5 GHz based networks increases into the hundreds and thousands, the number of existing networks connected to an IPX may become substantially greater than what the IPX can manage. Future IWG solutions may be required to interconnect large numbers of 3.5 GHz based networks with MNO networks and/or other third-party networks for many reasons. For example, 3.5 GHz based networks may need to access an IWG that can interconnect them to charge users in one network for using the other network and provide network connectivity to users as they access the other network. 3.5 GHz based networks also may need an IWG that can interconnect them so a user can continue accessing a specific third-party service or application even when the user has "roamed" onto an adjacent, interconnected network. For example, a 3.5 GHz based network may have a special arrangement that allows its users to access a third-party service, such as a banking service, and the users of that network may want to seamlessly access the banking service across all interconnected networks using only their network credentials or a single authentication into the service.

There are many challenges for an IWG to handle connections with a large number of networks. One of the many challenges is scaling. It is difficult and costly for conventional, dedicated hardware-infrastructure-based IWG solutions, such as conventional IPXs, to scale and support a large number of interconnecting networks. Another challenge is that the IWG would need to handle many different levels of parameters associated with the various networks' services, devices, usage scenarios, user-experience needs, etc., required for possibly hundreds or thousands of different networks deployed in the same 3.5 GHz band. It is challenging to accommodate every need of the interconnecting networks in a flexible manner. These challenges could lead to extremely expensive network and/or IWG deployments. Therefore, there is a need to provide an improved IWG that can interconnect a large number, such as hundreds or thousands, of networks and flexibly meet the needs of each interconnecting network.

SUMMARY

The disclosed embodiments overcome the disadvantages of the prior art by providing a scalable IWG solution implemented as a cloud-based service that may interconnect hundreds and thousands of networks, both large and small. In some embodiments, the IWG also may support one or more third-party services across multiple interconnected networks. Because the IWG may be implemented as a service in a cloud-based network architecture, it does not suffer the costs or complexities of incorporating additional hardware and configuration into conventional IPXs and, thus, can provide cost efficiencies in scaling for handling a large number of interconnecting networks.

The cloud-based IWG service may dynamically and seamlessly allow the interconnecting networks to share resources for their respective users. In some embodiments, the IWG service may be available for only a subset of users of these interconnected networks. The IWG service may be scaled to flexibly handle a large number of interconnections and may be configured to dynamically scale as new networks become available to the IWG and/or networks known to the IWG become unavailable. In some embodiments, the IWG service may be configured to switch a user between interconnected networks to optimize the user's use of network resources and/or meet the user's application or service requirements in different networks. In some embodiments, the IWG service may use machine learning to further serve the needs of one or more users across the interconnected networks.

In some disclosed embodiments, the IWG service may comprise one or more functions, such as but not limited to authentication functions, billing functions, and service level agreement (SLA) management functions, in accordance with at least one network's policies and procedures. For example, the IWG service may provide such functions for an MNO that has subscribed users who seek network connectivity in one or more 3.5 GHz based networks that are interconnected with the MNO via the IWG. In such embodiments, the IWG service may enforce the MNO's authentication, billing, and SLA requirements for users who access network services using the 3.5 GHZ based networks. For example, the IWG service may provide one or more of its functions to users in an enterprise network working in the 3.5 GHz CBRS band. In this example, the IWG may provide users in the enterprise network with network connectivity to another network, such as a larger MNO network, while also enforcing one or more policies, procedures, and requirements that would apply to those same users in the other network.

In accordance with the disclosed embodiments, the cloud-based IWG service may provide authentication functions to "on-board" a 3.5 GHz based network, such as an enterprise network, when it first connects to the IWG, such that the on-boarded network can interconnect with other networks and/or services accessible through the IWG. In some embodiments, when the IWG receives a registration request from the 3.5 GHz based network, the IWG can check if an interconnected MVO's SLA is locally available and authorized for use with users of the 3.5 GHz based network. In such embodiments, if the MVO's SLA is not locally available to the IWG service, the IWG may send an SLA request and/or an authorization request to the MNO to request if there is any SLA that the IWG should enforce with respect to users in the 3.5 GHz based network. In further embodiments, the IWG may communicate with a spectrum access system (SAS) to confirm the validity of the 3.5 GHz based network.

In some embodiments, after an acceptance criteria for the 3.5 GHz based network is received from a larger network (e.g., MNO network), the IWG service may subsequently request acceptance criteria information from the 3.5 GHz based network. Once an acceptance criteria response is received from the 3.5 GHz based network, the IWG may communicate with the larger network to finalize SLA selection for the 3.5 GHz based network. In accordance with this disclosed embodiment, after the SLA for the 3.5 GHz network has been finalized and confirmed via the IWG, the 3.5 GHz based network may start communicating directly with the larger network. In this embodiment, although the networks are interconnected to exchange data, the IWG may enforce the SLA for the 3.5 GHz network and periodically monitor one or more key performance indicators (KPIs) to confirm whether the 3.5 GHz network's communications with the interconnected network are in compliance with the SLA requirements.

In some embodiments, the cloud-based IWG service may comprise one or more additional functions, including but not limited to IWG administration functionality, IWG SLA functionality (e.g., in addition, or alternative, to an MNO's SLA functions), and IWG signaling functionality. The IWG signaling functionality may comprise, for example, one or more of a network-management function or a Diameter Routing Agent (DRA) for communicating with an MNO network using the Diameter protocol. In some embodiments, Diameter Edge Agents in an edge network may be in communication with the cloud-based IWG service, such that at least one of the Diameter interfaces between the Diameter Edge Agents and the IWG is also implemented as a cloud-based service. For example, the IWG may include certain network interfaces, such as HTTP or HTTPS interfaces, that are implemented using a scalable cloud-based architecture in the IWG service, whereas other non-scalable Diameter interfaces also may be implemented in the same IWG service. As a cloud-based service, the IWG may be scaled more easily than prior IPX implementations to handle hundreds or thousands of interconnecting networks and satisfy the users' individual requirements at different interconnecting networks in a flexible manner.

It is to be understood that both the foregoing general description and the following detailed description are exemplary and explanatory only, and are not restrictive of the disclosed embodiments as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
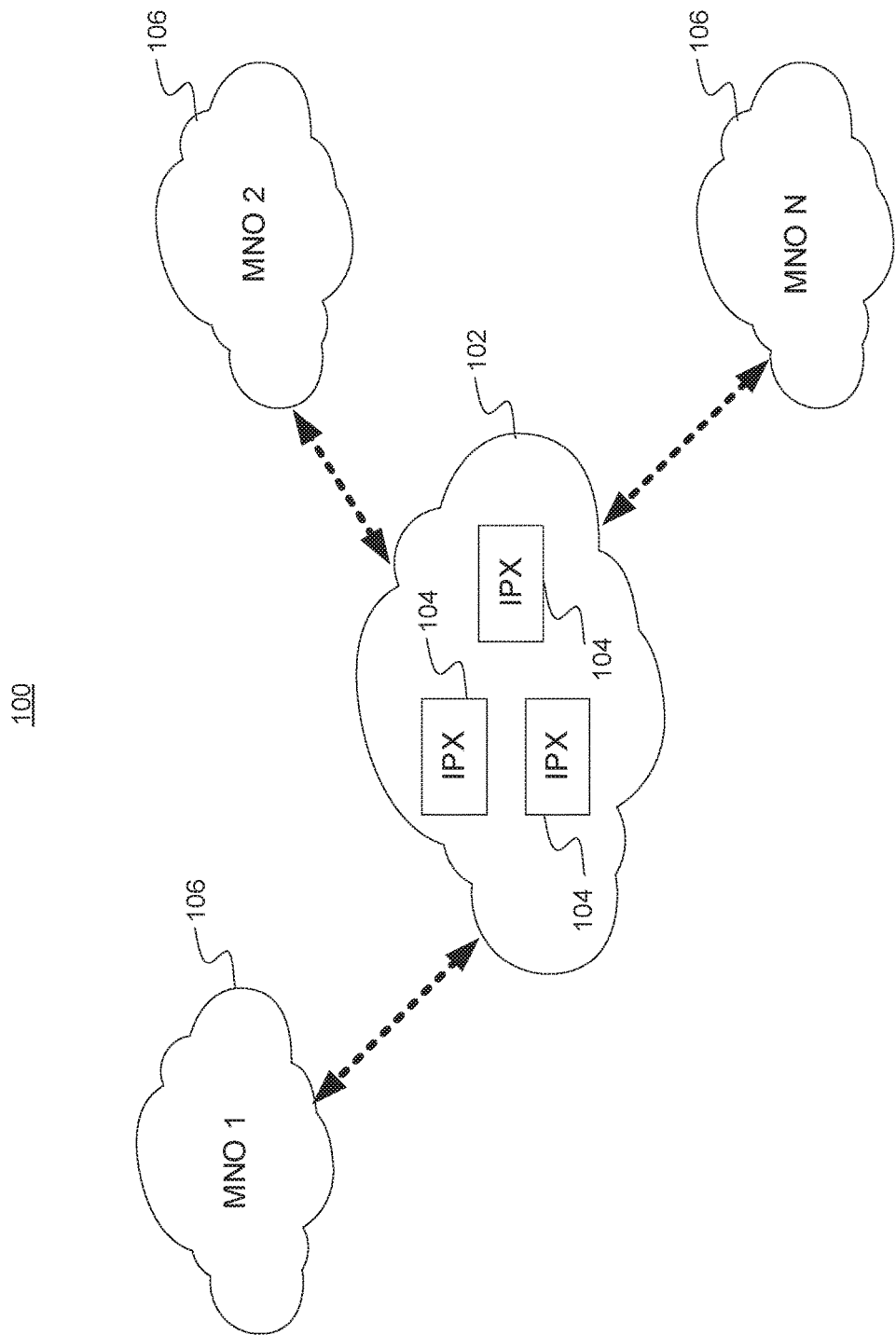
FIG. 1 is a schematic diagram of an exemplary network architecture including MNO networks that are interconnected using one or more IPXs.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods.

Although the disclosed embodiments may be described in terms of certain exemplary networks, devices, functions, and services, those skilled in the art will understand the teachings herein are more generally applicable. For example, while certain disclosed embodiments are described in terms of enterprise networks in the 3.5 GHz CBRS band that may be interconnected with MNO networks using an IWG, it is expressly contemplated that the inventions herein are not limited to the specific types of networks in the disclosed embodiments. The particular implementations in the disclosed embodiments are intended to be merely exemplary. Accordingly, the following detailed description is not limited to the disclosed embodiments and examples. Instead, the proper scope is defined by the appended claims.

The disclosed embodiments provide a scalable IWG solution implemented as a cloud-based service that may be used to interconnect a large number of networks, e.g., hundreds or thousands, both large and small. Unlike conventional IWG solutions, the disclosed embodiments may allow hundreds or thousands of different networks, such as 3.5 GHz based CBRS networks, to interconnect with each other using a cloud-based IWG service that flexibly offers one or more functions and services that can provide efficient and secure interconnection between different networks. In some embodiments, the cloud-based IWG service may provide a set of functions that one or more networks (such as 3.5 GHz based networks) need in order to satisfy one or more criteria established by at least one other network (such as an MNO network) for successfully interconnecting with that other network. Examples of the one or more criteria that must be satisfied may include, but are not limited to, at least one of authentication criteria, authorization criteria, SLA requirements, QoS requirements, or any combination thereof. Accordingly, examples of functions that the cloud-based IWG service may provide in the disclosed embodiments include, but are not limited to, at least one of authentication functions, billing functions, and SLA management functions established by an interconnected network, such as an MNO network, in accordance with that network's policies and procedures.

FIG. 1 illustrates a schematic diagram of an exemplary network architecture 100 including MNO networks 106 interconnected to a network 102 having one or more IPXs 104. As illustrated in FIG. 1, when a first MNO network 106 needs to connect to a second MNO network 106, the first MNO network may communicate with an IPX 104 in network 102 to determine one or more criteria, such as, for example, policy criteria, billing criteria, SLA criteria, QoS criteria, and security requirements, for connecting to the second MNO network. The IPXs 104 may communicate with the MNO networks 106 to determine which MNO networks 106 satisfy each other's criteria and requirements, in accordance with the policies and procedures specific to each MNO network. Once the first MNO network is authorized to connect with the second MNO network, one or more IPXs 104 may provide a network interconnection between the first and second MNO networks. More generally, to interconnect with another MNO network 106, each MNO network may only need to communicate with one or more IPXs 104 in network 102, rather than communicating directly with another MNO network 106.

By way of example, in the case of roaming, when a user of a first MNO network 106 wants to use network resources of a second MNO network 106 that is available at the user's location, the first and second MNO networks 106 may need to communicate with each other via the IPXs 104 in network 102 for various purposes, such as for example, authenticating the user before the user is allowed to join the second MNO network, billing the user's original (first) MNO network 106 for supporting the user's traffic, sending the second MNO network 106 data associated with the user in order to support specific applications, or any combination thereof. In this manner, rather than the first and second MNO networks 106 communicating directly with each other, these MNO networks 106 may only need to communicate with one or more IPXs in network 102 to provide roaming capabilities to the user.

However, a conventional IPX network 102 may not be capable of supporting interconnections between hundreds or thousands of different networks. For example, when there are thousands of smaller, networks deployed in the 3.5 GHz band trying to interconnect with larger networks, such as MNO networks 106, IPX network 102 may not be able to handle many different levels of parameters associated with the various networks' services, devices, usage scenarios, user-experience needs, etc., required for each of the thousands of smaller networks. Therefore, there is a need to provide an improved IWG that can interconnect a larger number, such as hundreds or thousands, of networks and flexibly meet the needs of each interconnecting network.

Figure 2:
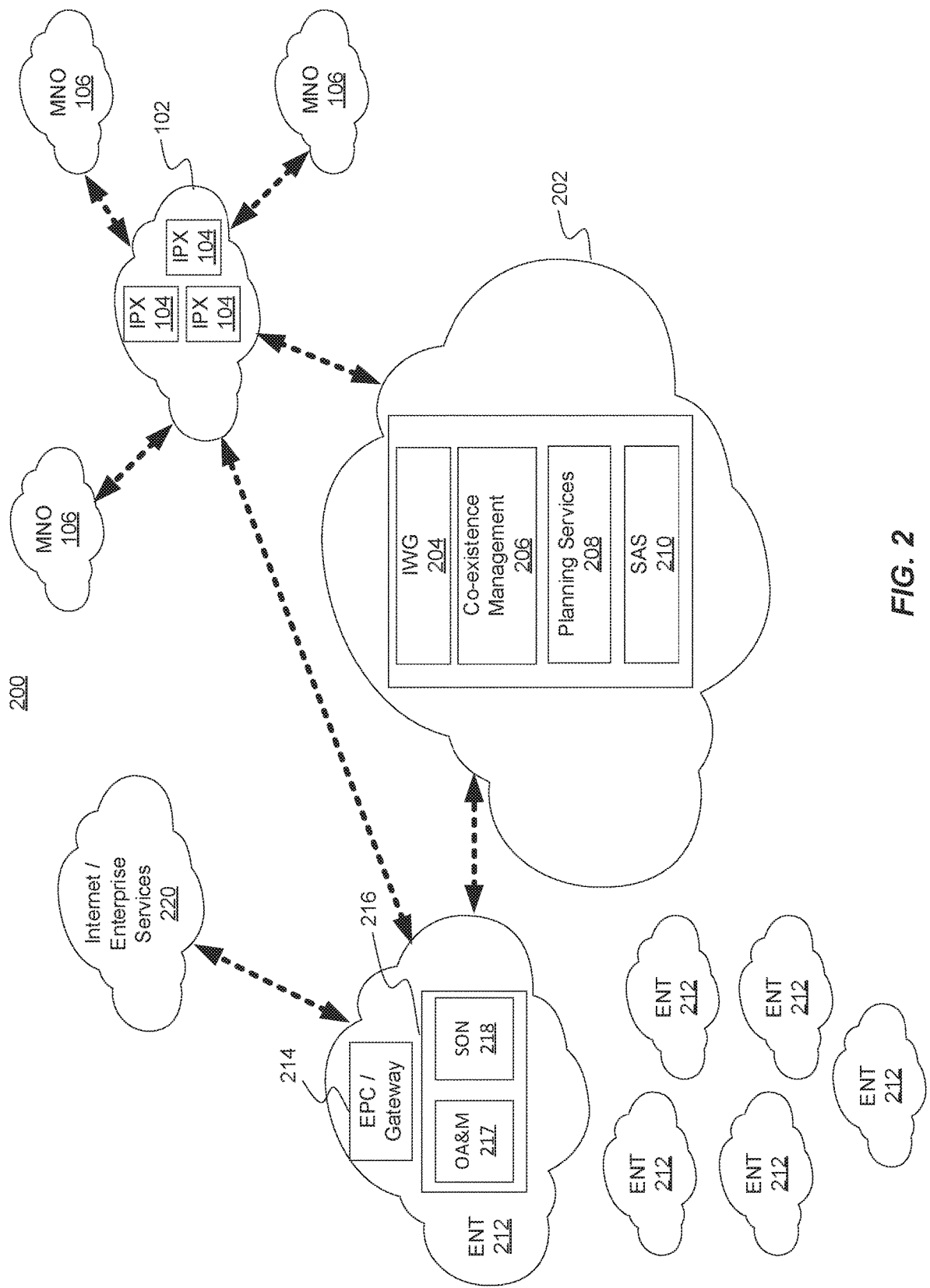
FIG. 2 is a schematic diagram of an exemplary network architecture including a cloud-based IWG service that may be used to interconnect one or more enterprise networks to one or more MNOs in accordance with certain illustrative embodiments described herein.

FIG. 2 shows a schematic diagram of an exemplary network architecture 200 including an IWG 204, which is preferably a cloud-based service that may be used in accordance with certain disclosed embodiments. In some embodiments, the IWG 204 may intelligently interconnect one or more smaller enterprise networks 212 with one or more larger MNO networks 106 to facilitate seamless sharing of resources across networks to serve user application needs, such as for MNO subscribers that are located in one or more smaller enterprise networks 212. In some embodiments, IWG 204 may use machine learning to predict user application needs and improve the sharing of resources across interconnected networks.

As seen in FIG. 2, IWG 204 may co-exist in a cloud-based network 202 with one or more additional services, such as a co-existence management service 206, planning service 208, and spectrum access system 210. IWG 204 may interconnect one or more enterprise networks 212 to one or more MNO networks 106 via one or more IPXs 104 in an IPX network 102. In other embodiments, the IWG service 204 may interconnect one or more enterprise networks 212 with one or more MNO networks 106 using additional support from one or more Internet or Enterprise services 220. Each enterprise network 212 may comprise one or more functions, including but not limited to Evolved Packet Core (EPC) functions 214, Operations, Administration and Management (OA&M) functions 217, and Self-Organizing Network (SON) function 218. As shown by the dotted arrows in FIG. 2, the functions 214, 217, and 218 in an enterprise network 212 may facilitate communication with one or more services in the cloud-based network 202, one or more Internet and Enterprise services 220, and/or one or more functions in the IPX network 102 in order to interconnect the enterprise network 212 with at least one MNO network 106. For example, OA&M functions 217 may communicate with the IWG service 204 to log, configure, report, and/or monitor one or more metrics associated with enterprise networks 212.

Figure 3:
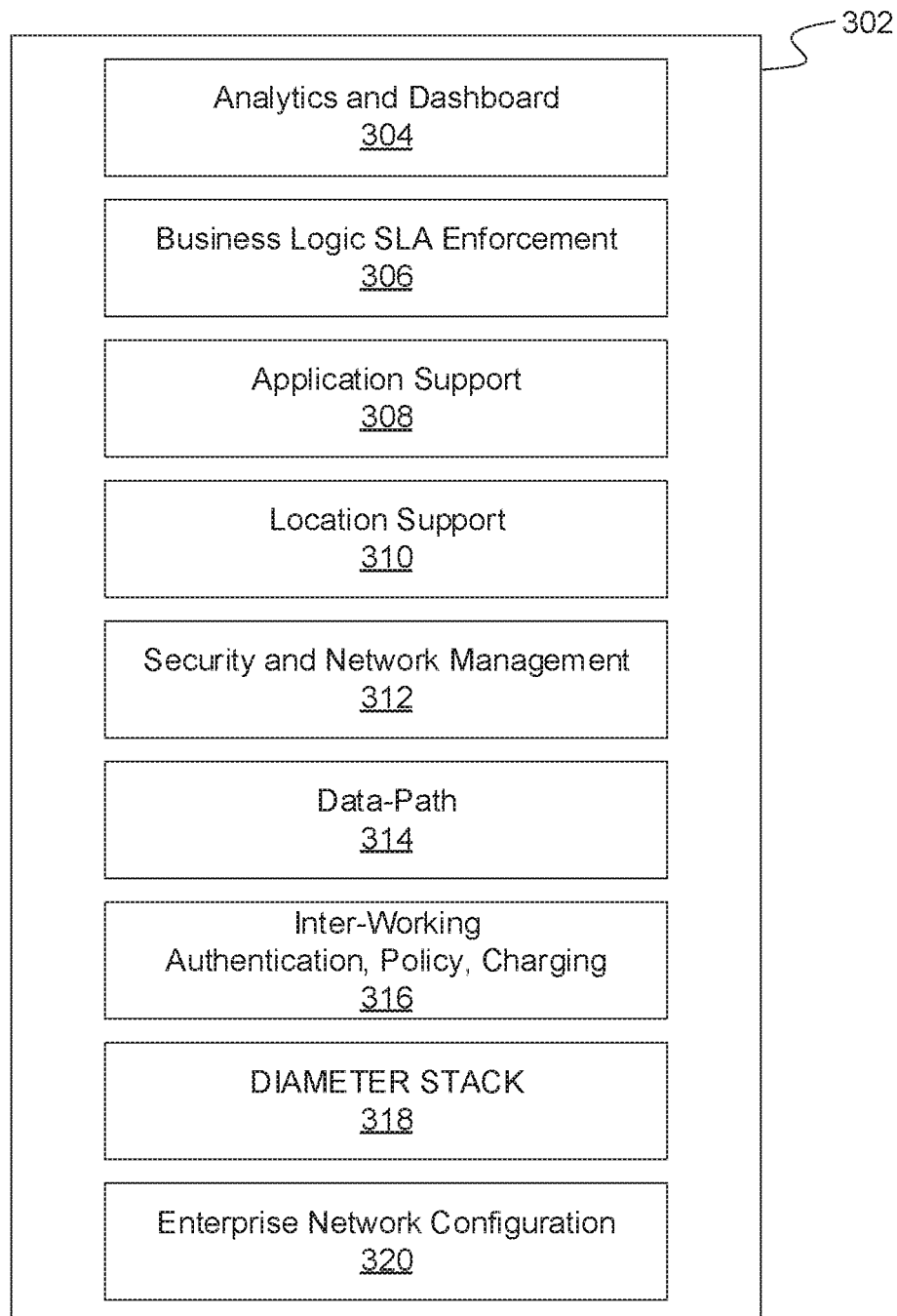
FIG. 3 is an example of functions that may be provided by an exemplary cloud-based IWG service in accordance with certain illustrative embodiments described herein.

FIG. 3 illustrates an example of functions and services that may be provided by cloud-based services 302 in accordance with certain disclosed embodiments to facilitate interconnection between one or more enterprise networks 212 and one or more MNO networks 106. These functions and services may be implemented, for example, using the cloud-based IWG service 204 in FIG. 2. In some embodiments, the cloud-based services 302 may comprise one or more of an Analytics and Dashboard service 304, a Business Logic SLA Enforcement service 306, an Application Support service 308, a Location Support service 310, a Security and Network Management service 312, a Data Path service 314, an IWG service 316, a Diameter Stack service 318, and an Enterprise Network Configuration service 320.

In some embodiments, the Analytics and Dashboard service 304 may be configured to enhance visibility into the operations of one or more enterprise networks 212 that support wireless communications in the 3.5 GHz band. For example, the Analytics and Dashboard service 304 may be configured to analyze and monitor the operations of one or more networks 212 in the 3.5 GHz band and provide reports and metrics indicative of the operations, such as one or more KPI reports, metrics evaluation, and network health and security assessment.

In some embodiments, the Analytics and Dashboard service 304 may also be configured to determine subscriber level intelligence of user behavior for each subscriber of one or more MNO networks 106. For example, the Analytics and Dashboard service 304 may be configured to determine which networks, such as enterprise networks 212, a subscriber of one or more MNO networks 106 is connecting to, the time of each connection, and the duration of each connection. In addition, the Analytics and Dashboard service 304 may be configured to determine subscriber level data usage indicators. For example, the Analytics and Dashboard service 304 may determine how much traffic is routed back to the one or more MNO networks 106. The Analytics and Dashboard service 304 may display the subscriber level usage indicators as a percentage of Local Break Out usage (with enterprise co-operation) or in Data Offload scenarios. In other embodiments, the Analytics and Dashboard service 304 may determine aggregated trends of connectivity behavior and data usage. For example, the Analytics and Dashboard service 304 may aggregate connectivity behavior and data usage over subscribers for specific enterprise networks, MNO networks 106, geographical location, enterprises, or mobility patterns.

In some embodiments, the Analytics and Dashboard service 304 may leverage one or more reports, metrics, and/or indicators and create a social graph of one or more networks, such as for example one or more of the enterprise networks 212 and/or MNO networks 106. The Analytics and Dashboard service 304 may further track "friends" at a network level. For example, the Analytics and Dashboard service 304 may track which enterprise network 212 interconnects with another MNO network 106 and for which applications, or how often enterprise networks 212 interconnect with other MNO networks 106. In some embodiments, the Analytics and Dashboard service 304 may form groups of networks, such as groups of enterprise networks 212, based on common interests. For example, the Analytics and Dashboard service 304 may group networks, such as enterprise networks 212, based on at least one of usage patterns, location proximity, applications, user demographics, or operational hours associated with each network. Forming groups may be particularly useful for group-based business logic creation, signaling optimization, and context-aware marketing.

In some embodiments, the Business Logic SLA Enforcement service 306 may be configured to determine whether one or more networks in the 3.5 GHz band, such as enterprise networks 212, satisfy SLAs specific to each of the one or more MNO networks 106. The Business Logic SLA Enforcement service 306 may determine whether SLA requirements are satisfied based on reports provided by the Analytics and Dashboard service 304, such as one or more KPI reports, metrics evaluation, and network health and security assessment. Business Logic SLA Enforcement service 306 may be further configured to translate one or more protocols in an intuitive, common language that may be used to send one or more types of network information associated with the one or more enterprise networks in the 3.5 GHz band.

In some embodiments, Application Support service 308 may be configured to provide application level support for one or more enterprise networks 212 in the 3.5 GHz band. For example, Application Support service 308 may provide E-911 functions and support to one or more networks in the 3.5 GHz band, thereby allowing the networks to connect to, e.g., a Gateway Mobile Location Center (GMLC), Evolved Serving Mobile Location Center (E-SMLC) or other Public Safety Answering Point (PSAP) nodes for emergency services. Application Support service 308 may further comprise Commercial Mobile Alert Systems (CMAS) or an emergency warning system support configured to disseminate emergency alerts to one or more mobile devices. In addition, Application Support service 308 may comprise signaling support for one or more services provided by the MNO networks 106. For example, application support service 308 may facilitate connectivity to Internet Multimedia System (IMS) nodes.

In some embodiments, Location Support service 310 may be configured to determine a location of one or more subscribers and provide the location to third-party services. For example, Location Support service 310 may determine a location of a subscriber to one or more MNO networks 106 and provide the location information to third-party Internet/Enterprise services 220 to facilitate interconnection.

In other embodiments, Security and Network Management service 312 may be configured to enhance security and protect one or more MNO networks 106 from a breach of sensitive data. For example, Security and Network Management service 312 may provide topology hiding, through which customer information or other network information may be hidden from other networks. For example, Security and Network Management service 312 may hide sensitive information associated with one or more subscribers of the MNO networks 106 such that the subscriber information cannot be seen by other networks, including enterprise networks 212 or Internet/Enterprise services 220. In some embodiments, one or more interconnections between networks may be encrypted in order to enhance security and hide sensitive user or subscriber information. Security and Network Management service 312 may also deny access to one or more MNO networks 106 by unauthorized networks. For example, if an enterprise network 212 has not been authorized to access one or more MNO networks 106, Security and Network Management service 312 may deny enterprise network 212 from interconnecting with one or more MNO networks 106. Security and Network Management service 312 may also prevent denial-of-service (DoS) attacks, which may make one or more networks unavailable to its intended subscribers or users. For example, Security and Network Management service 312 may prevent DoS attacks on one or more MNO networks 106 so that the one or more MNO networks 106 may remain available to its subscribers. In other embodiments, Security and Network Management service 312 may prevent resource-draining overload so that sufficient resources are available to the subscribers of one or more MNO networks 106. Security and Network Management service 312 also may be configured to provide attribute-value pairs (AVP) validation and may be configured to prevent any unauthorized access to one or more networks.

In some embodiments, the Security and Network Management service 312 may control traffic overload and congestion at one or more networks. For example, Security and Network Management service 312 may protect one or more MNO networks 106 from signaling storms and overload scenarios. Similarly, Security and Network Management service 312 may also protect IWG 204 from signaling storms and overload scenarios.

In further embodiments, the Security and Network Management service 312 may ensure that service communities are isolated. Accordingly, an MNO network 106 may only be able to access details, such as KPIs, related to its own subscribers connecting to one or more networks in the 3.5 GHz band. Similarly, a network in the 3.5 GHz band, such as an enterprise network 212, may only be able to access details pertaining to its own network. Unless explicitly allowed by SLAs, Security and Network Management service 312 may be configured to ensure that no private configuration is shared between entities.

In some embodiments, Data Path service 314 may comprise one or more data processing units. Data Path 314 may be configured to perform data processing in order to interconnect one or more networks in the 3.5 GHz band to other third-party services or one or more MNO networks 106. For example, the Data Path service 314 may be configured to provide one or more enterprise networks 212 with access to an Internet server, NH HotSpot 2.0, or roaming services.

In other embodiments, IWG service 316 may provide one or more functions, such as but not limited to an authentication function, policy function, and charging function. For example, IWG service 316 may be configured to authenticate and authorize one or more enterprise networks 212 before facilitating interconnection between one or more enterprise networks 212 and one or more MNO networks 106. IWG service 316 may intelligently route network communications to or from one or more enterprise networks 212 based on information associated with one or more MNO networks 106. For example, IWG service 316 may route network communications to or from one or more enterprise networks 212 based on SLAs specific to each MNO network 106. The IWG service 316 may also implement multi-criteria routing rules to route one more enterprise networks 212 based on various protocols, AVPs and AVP values, source and/or destination in routing requests, and multi-point routing requirements. In some embodiments, the IWG service 316 may be configured to use machine learning to predictively connect one or more subscribers to an appropriate enterprise network 212 in the 3.5 GHz band based on knowledge of the one or more subscribers' behavior history. In other embodiments, the IWG service 316 may store one or more "white" and "black" listings for networks, e.g., in the 3.5 GHz band. For example, the "white" listing may comprise a list of one or more networks that has been granted access to one or more MNO networks 106. In contrast, the "black" listing may comprise a list of one or more networks in the 3.5 GHz band that has been denied access to one or more MNO networks 106. The "white" and "black" listings may be specific to each MNO network 106. As such, the IWG service 316 may access the "white" and "black" listings to route network communications to or from one or more enterprise networks 212 based on information associated with one or more MNO networks 106.

In yet another embodiment, Diameter stack 318 may comprise one or more protocols, including but not limited to a Diameter Signaling Controller (DSC), Diameter Signaling Router (DSR), Diameter Relay Agent (DRA), Diameter Edge Agent (DEA), and Diameter Proxy Agent (DPA). Diameter stack 318 may be configured to ensure that one or more networks are capable of communicating with another network using the Diameter protocol. In alternative embodiments, the Diameter stack 318 could be replaced with another protocol stack for one or more network communication protocols used for internetwork communications.

In some embodiments, the Enterprise Network Configuration service 320 may be configured to set up a configuration of one or more enterprise networks 212 in order to facilitate interconnection between one or more enterprise networks 212 and one or more MNO networks 106. Accordingly, the Enterprise Network Configuration service 320 may facilitate seamless connection for one or more networks in the 3.5 GHz band to larger MNO networks 106. In addition, the Enterprise Network Configuration service 320 may assist subscribers of one or more MNO networks 106 to communicate in an enterprise network 212. In some embodiments, the Enterprise Network Configuration service 320 may monitor network health of one or more networks in the 3.5 GHz band. For example, Enterprise Network Configuration service 320 may monitor one or more metrics indicative of the network health of one or more enterprise networks 212, and generate an alert or an alarm when the Enterprise Network Configuration service 320 detects an abnormal behavior or overload condition. Enterprise Network Configuration service 320 may comprise an Operations Support System (OSS) configured to monitor, control, analyze, and manage services in one or more networks in the 3.5 GHz band, such as enterprise networks 212.

Figure 4A:
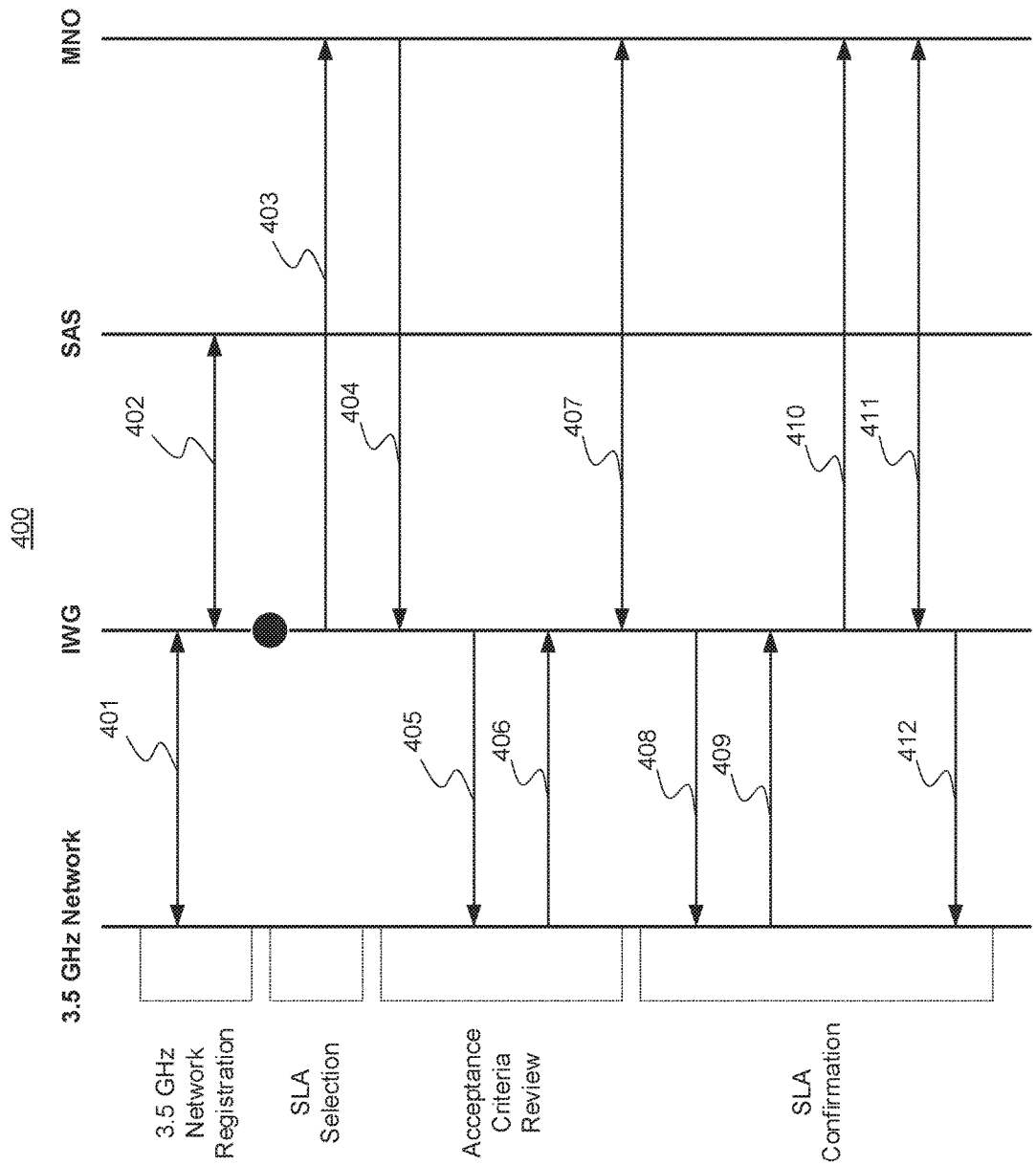
FIGS. 4A and 4B are flow diagrams of an exemplary procedure that may be used by a cloud-based IWG service to interconnect a 3.5 GHz based enterprise network and an MNO in accordance with certain illustrative embodiments described herein.
Figure 4B:
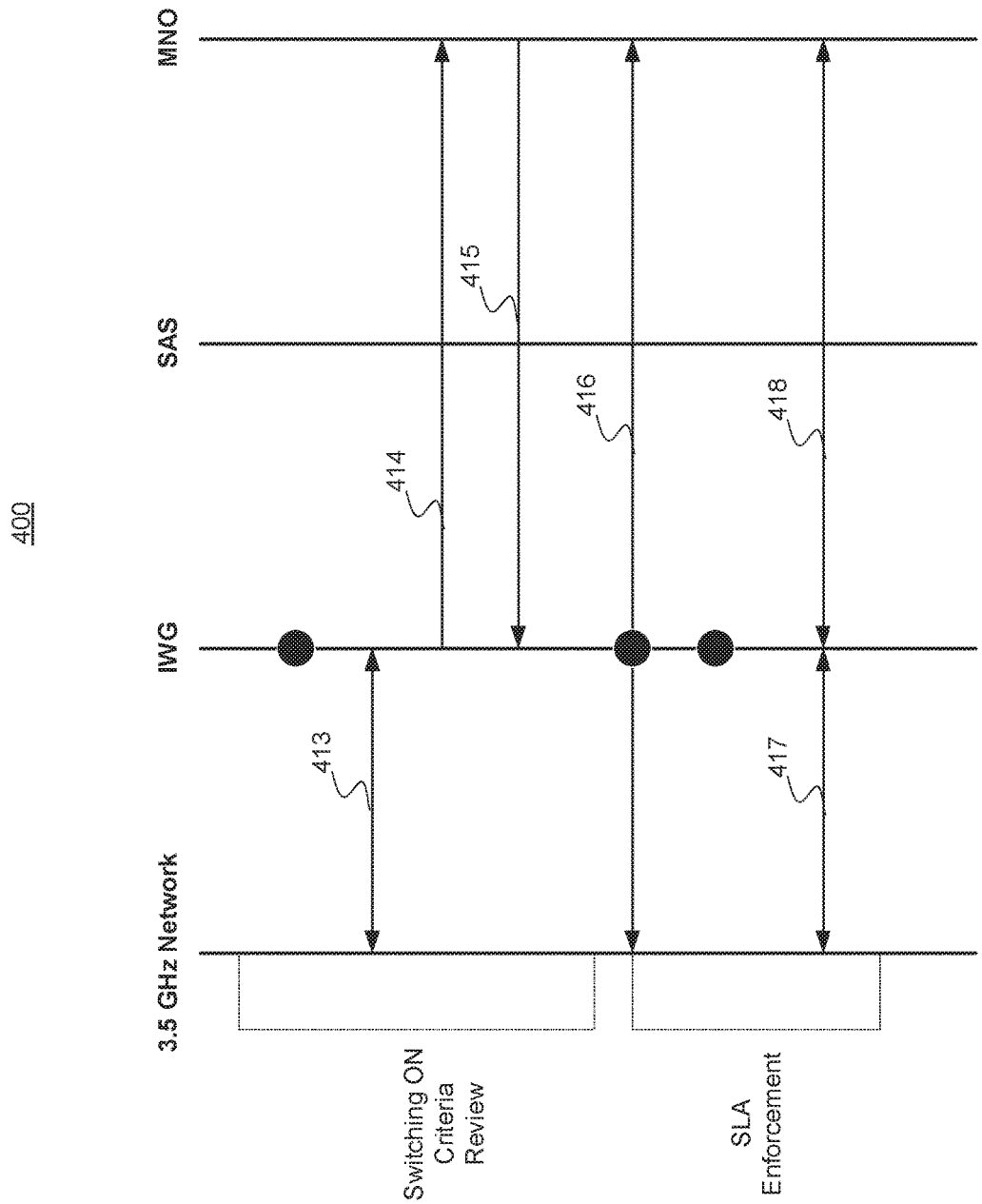

FIGS. 4A and 4B illustrate a flow diagram of an exemplary procedure 400 for starting an interconnection between a 3.5 GHz enterprise network 212 and an MNO network 106 via the IWG 204 in accordance with the disclosed embodiments. This exemplary flow diagram is provided merely by way of example. The exemplary procedure 400 in FIGS. 4A and 4B can be executed or otherwise performed by one or more combinations of various systems. In the disclosed embodiments, the procedure 400 described below may be carried out by a cloud-based IWG service 204, as shown in FIG. 2, and for this reason, various exemplary elements of FIGS. 1 and 2 are referenced in explaining the exemplary procedure 400. Each arrow in FIGS. 4A and 4B represents one or more steps, processes, or methods.

Referring to FIG. 4A, the exemplary method 400 starts at step 401 where the IWG service 204 may receive a request from a 3.5 GHz based network to interconnect with one or more MNO networks 106. The 3.5 GHz based network may be, for example, an enterprise network 212 in FIG. 2. After receiving a request from the 3.5 GHz network, IWG 204 may request registration information and/or authentication information from the 3.5 GHz network. Then, after receiving the registration information and/or the authentication information from the 3.5 GHz network, at step 402, the IWG service 204 may check the validity of the 3.5 GHz network with a SAS. At step 403, IWG 204 may check if the 3.5 GHz network has a SLA with one or more MNO networks 106 by checking locally if it has access to such an SLA. If the IWG 204 cannot determine from its locally accessible information whether the 3.5 GHz network has an SLA with one or more MNO networks 106, then at step 403, the IWG service 204 may send a request for the SLA with one or more MNO networks 106 and/or an authorization for the 3.5 GHz network to interconnect with one or more MNO networks 106. In some embodiments, at step 403, the IWG 204 may provide network details associated with the 3.5 GHz network when requesting an SLA and/or authorization from one or more MNO networks 106. For example, the IWG 204 may review network capabilities and/or network planning associated with the 3.5 GHz network and send the information to one or more MNO networks 106 when requesting an SLA and/or authorization.

After the request for an SLA and/or authorization is sent to one or more MNO networks 106, at step 404, the IWG service 204 may receive an acceptance criteria for the 3.5 GHz network in order to determine an SLA with one or more MNO networks 106 and receive authorization to interconnect. At step 405, the IWG 204 may send the acceptance criteria received from one or more MNO networks 106 to the 3.5 GHz network. The acceptance criteria may comprise, for example, attribute value pairs (AVP) content, quality of service (QoS), location, an IP address, or other information associated with the 3.5 GHz network.

At step 406, the IWG service 204 may receive the acceptance criteria information from the 3.5 GHz network. Then, at step 407, the IWG service 204 may send the acceptance criteria information received from the 3.5 GHz network to one or more MNO networks 106. Based on the received acceptance criteria information associated with the 3.5 GHz network, IWG 204 may communicate with one or more MNO networks 106 to create, select, and finalize an SLA for the 3.5 GHz network. In some embodiments, the SLA created may vary for different 3.5 GHz networks and user-application categories. In some embodiments, the IWG 204 may automatically create an SLA for the 3.5 GHz network with one or more MNO networks 106 when the IWG 204 receives a request from the 3.5 GHz network to interconnect to one or more MNO networks 106.

After the SLA for the 3.5 GHz network has been created at the IWG 204, at step 408, the IWG 204 may send SLA requirements to the 3.5 GHz network. The SLA requirements may comprise, for example, one or more service expectations requested by the 3.5 GHz network and/or one or more requirements that one or more MNO networks 106 expects from the 3.5 GHz network. In some embodiments, the SLA requirements may comprise one or more types of services requested, QoS requested, billing requirements, times/dates/locations of services requested, service availability, security of service, or any other requirements associated with the 3.5 GHz network and/or services provided by one or more MNO networks 106.

At step 409, the IWG service 204 may receive an SLA response from the 3.5 GHz network. After receiving the SLA response from the 3.5 GHz network, at step 410, the IWG 204 may forward the SLA response to one or more MNO networks 106. At step 411, one or more MNO networks 106 may review the SLA response from the 3.5 GHz network and determine whether the requirements outlined in the SLA response may be satisfied. If one or more MNO networks 106 determines that the SLA requirements may be satisfied, one or more MNO networks 106 may send an SLA confirmation to the IWG 204 at step 411. After receiving the SLA confirmation, IWG 204 may send the SLA confirmation received from one or more MNO networks 106 to the 3.5 GHz network at step 412.

FIG. 4B illustrates another flow diagram of additional steps that may be performed in accordance with the exemplary procedure 400 of FIG. 4A according to the disclosed embodiments. As discussed above with respect to FIG. 4A, the procedure in FIG. 4B described below also may be carried out by the cloud-based IWG service 204, as shown in FIG. 2, and various elements of FIGS. 1 and 2 are referenced in explaining the exemplary flow diagram in FIG. 4B. Here again, each arrow in FIG. 4B represents one or more steps, processes, or methods in the exemplary method.

Referring to FIG. 4B, the exemplary method 400 may continue at step 413 confirming the SLA between the 3.5 GHz network and the one or more MNO networks 106. At step 413, the IWG service 204 may review the SLA between the 3.5 GHz network and the one or more MNO networks 106, e.g., periodically. By way of example, the IWG service 204 may review the SLA based on a predetermined review phase and/or interval. In some embodiments, at step 413, the IWG 204 may review various criteria in the SLA, including but not limited to one or more KPI reports, one or more service metrics, network health, network security, billing requirements, and QoS.

Based on the one or more reviews, at step 414, the IWG 204 may determine that the 3.5 GHz network is ready to interconnect to one or more MNO networks 106. After IWG 204 determines that the 3.5 GHz network is ready to interconnect, the IWG 204 may send a notification to one or more MNO networks 106 indicating that the 3.5 GHz is ready to interconnect at step 414. Then, at step 415, IWG 204 may receive a response from one or more MNO networks 106 indicating that the one or more MNO networks 106 are also ready to interconnect with the 3.5 GHz network. After receiving the response from one or more MNO networks 106, at step 416, the IWG 204 may establish an interconnection between the 3.5 GHz network and the one or more MNO networks 106. IWG 204 may send a notification to the 3.5 GHz network and to one or more MNO networks 106 that interconnection has been established.

After starting the interconnection, at step 417, the IWG service 204 may continue monitoring the 3.5 GHz network. For example, IWG 204 may monitor the 3.5 GHz band periodically, on a predetermined schedule, or on-demand. In some embodiments, the IWG service 204 may receive a request from one or more MNO networks 106 to monitor the 3.5 GHz band and, in response to such a request, the IWG service 204 may monitor the 3.5 GHz band on-demand. The IWG service 204 may monitor various characteristics associated with the 3.5 GHz band, including but not limited to one or more KPIs, network health, network performance, and network security. At step 418, the IWG 204 may provide the one or more KPI reports, metrics evaluation, network health and security assessments, and other analytic reports to one or more MNO networks 106 based on the monitoring of the 3.5 GHz network at step 417.

As discussed above, the IWG service 204 may manage both users of the 3.5 GHz networks and subscribers of one or more MNO networks, such as MNO networks 106. In some embodiments, a subscriber of one or more MNO networks may be presented with a list of one or more networks in the 3.5 GHz band that are available to join, for example based on at least one of signal strength or a locked/unlocked status of the one or more networks in the 3.5 GHz band. In addition, the list of one or more networks in the 3.5 GHz band may also provide an indication of which network may serve the subscriber, for example based on the IWG service's knowledge of any SLAs that the 3.5 GHz networks have with an MNO network associated with the subscriber. Depending on the 3.5 GHz networks' SLA with the MNO network, the subscriber's overall experience may be optimized. For example, different MNO services may be available on different 3.5 GHz networks, and thus, the subscriber may find an MNO-related incentive to join a particular 3.5 GHz network even if the signal strength of that particular 3.5 GHz network is not the strongest. In other embodiments, different 3.5 GHz networks may have different cost implications to the subscriber. In some embodiments, the subscriber may interact with the IWG service 204 to switch between one or more 3.5 GHz networks based on evolving needs of the subscriber. In yet other embodiments, the subscriber may choose a 3.5 GHz network based on the capabilities of the 3.5 GHz network advertised by the IWG service 204. In some embodiments, the IWG service 204 may predict which 3.5 GHz network would be a good choice for the subscriber and predictively connect the subscriber to an appropriate 3.5 GHz network based on the subscriber's behavior history.

In some embodiments, a subscriber of an MNO network may be able to reach the IWG service 204 without first committing to a particular 3.5 GHz network. For example, the subscriber may reach the IWG service 204 via a default or "open," and possibly free, network connection via any one of the 3.5 GHz networks. In some embodiments, the subscriber may reach the IWG service 204 via a Wi-Fi connection available at the location of the subscriber. In other embodiments, the subscriber may reach the IWG service 204 via a Macro connection if the subscriber is in the Macro's range. For example, a Macro connection may be available in a Neutral Host approach.

In an exemplary disclosed embodiment, a subscriber may select a 3.5 GHz network from various network options. For example, the subscriber may connect to the IWG service 204 via a software application and communicate the subscriber's selection of a particular 3.5 GHz network to the IWG service 204 via the software application. The software application may have an intuitive, common language used to indicate information associated with each 3.5 GHz network received from the IWG service 204. For example, the information associated with a 3.5 GHz network may identify or correspond to services offered by and/or capabilities of the 3.5 GHz network. In some embodiments, the software application may comprise an interface that can be configured to display to the subscriber a list of 3.5 GHz networks that are available to join at a particular location.

Figure 5:
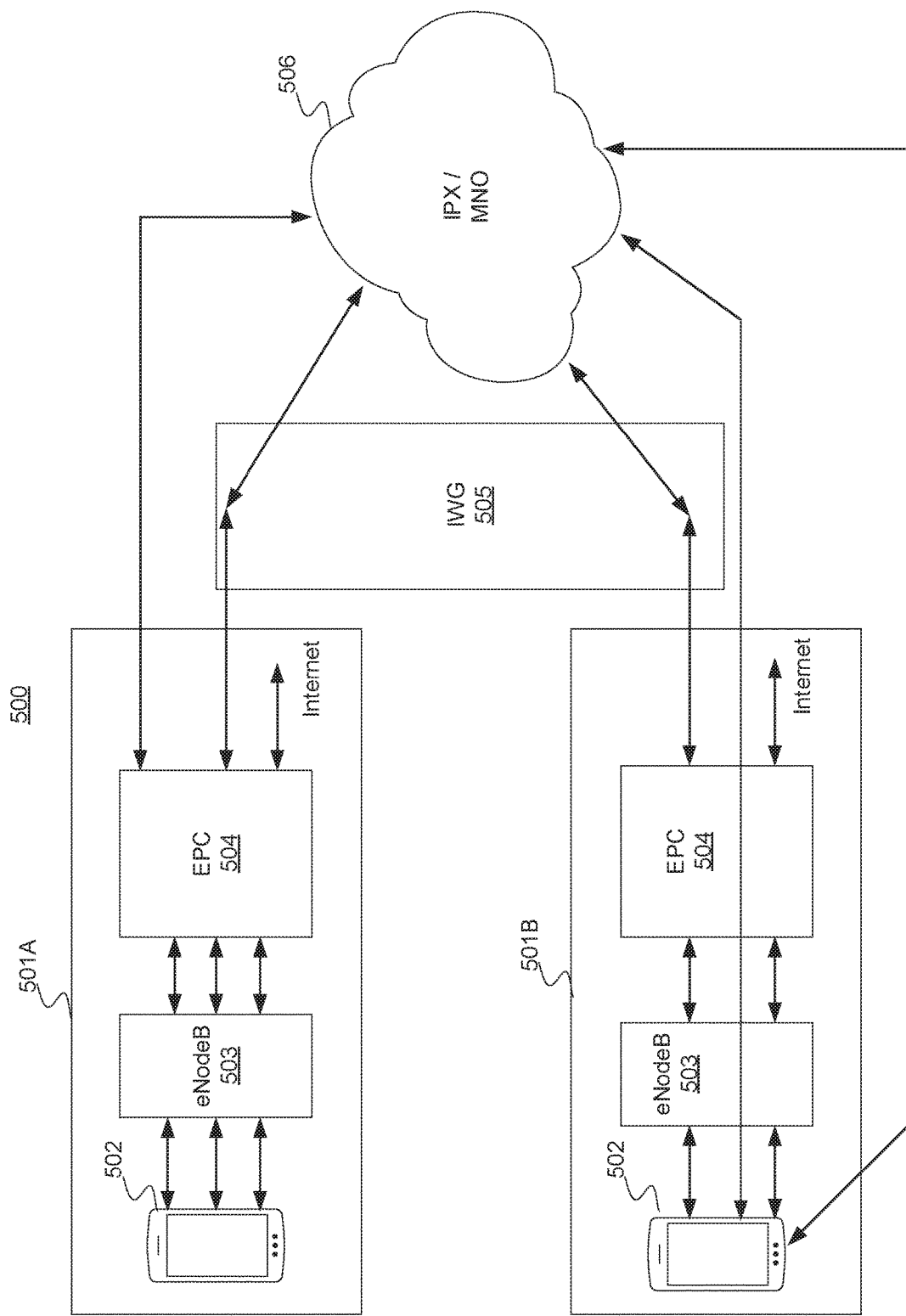
FIG. 5 is a schematic diagram showing an exemplary IWG service that may be used to interconnect user devices, for example on 3.5 GHz based enterprise networks, with one or more MNOs in accordance with certain illustrative embodiments described herein.

FIG. 5 illustrates a schematic diagram of an exemplary network topology 500 illustrating exemplary mechanisms that may be used to interconnect user devices in a first network with one or more MNO networks using a cloud-based IWG service 505 in accordance with the disclosed embodiments. In some embodiments, the IWG may implement a standard roaming mechanism 501A and/or a neutral-host mechanism 501B to facilitate communications between user devices 502 in one or more access networks, such as 3.5 GHz based enterprise networks 212, with one or more IPX-based MNO networks 506. By way of example, the user devices 502 may be any user equipment configured to communicate, for example, with an access point or base station, such as an eNodeB 503 in FIG. 5.

As shown in FIG. 5, in both standard roaming mechanism 501A and neutral-host mechanism 501B, the exemplary user equipment 502 communicates with the IWG service 505 through a respective eNodeB 503 and EPC 504. For both the standard roaming mechanism 501A and neutral-host mechanism 501B in this exemplary embodiment, each user equipment 502 may have access to the Internet using eNodeB 503 and EPC 504, without the IWG service 505 having to interconnect the user equipment's network to one or more MNO networks 506. While the IWG 505 provides a cloud-based interface for interconnecting the user's access networks with the one or more MNO networks 506, unlike the exemplary standard roaming mechanism 501A, the exemplary neutral-host mechanism 501B further provides a direct communication path from the user's access network to the MNO networks or, alternatively, an encrypted "tunnel," such as an IPSec tunnel or virtual private network, that enables direct communications with the MNO networks 506. As such, in this example, using the neutral-host mechanism may be able to establish a dual connection from the user's access network to the one or more MNO networks 506, one connection communicating via eNodeB 503 and EPC 504 and the other connection configured to by-pass the eNodeB 503 and EPC 504.

Figure 6:
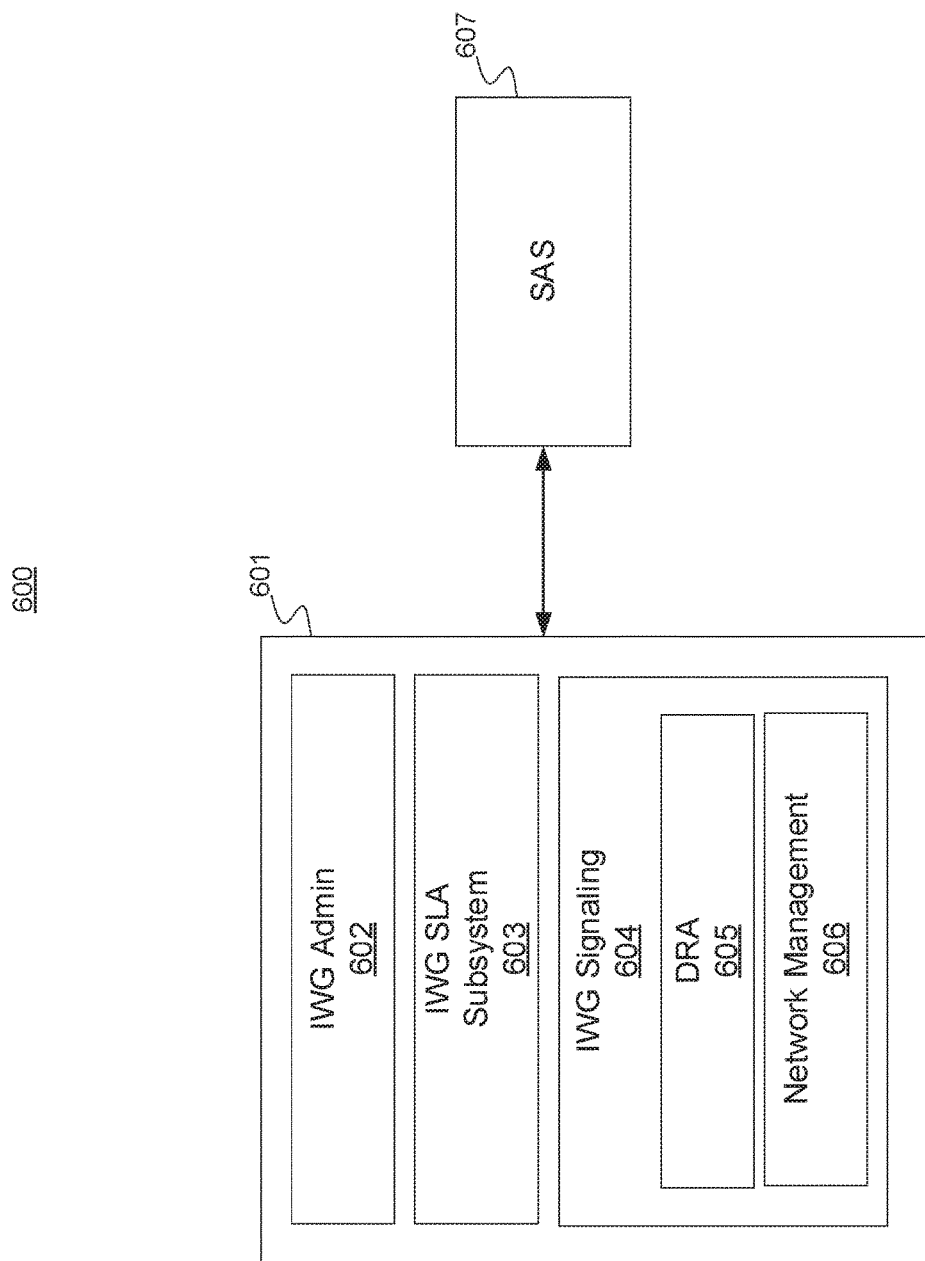
FIG. 6 is a schematic diagram of an exemplary cloud-based IWG service in communication with a spectrum access system (SAS) in accordance with certain illustrative embodiments described herein.

FIG. 6 shows an exemplary network architecture 600 illustrating an IWG service 601 in communication with an SAS 607 in accordance with the certain disclosed embodiments. As FIG. 6 shows, the IWG service 601 may comprise one or more sub-functions, including but not limited to an IWG administration function 602, an IWG SLA subsystem 603, an IWG signaling function 604, a Diameter Relay Agent 605, and a network management function 606. One or more of these sub-functions may be configured to connect to other services in the cloud, including but not limited to an SAS 607. As discussed above with reference to FIGS. 4A and 4B, one or more sub-functions of IWG service 601 may communicate with SAS 607 to on-board one or more 3.5 GHz networks, such as enterprise networks 212, and establish an interconnection between one or more 3.5 GHz networks and one or more MNO networks 106. By way of example, one or more sub-functions of IWG service 601 may communicate with SAS 607 in order to check validity of one or more 3.5 GHz networks. For example, one or more sub-functions of IWG service 601 may communicate with SAS 607 in order to check registration information and/or authentication information associated with one or more 3.5 GHz networks, thereby validating one or more 3.5 GHz networks with SAS 607. In the disclosed embodiments, each disclosed function and sub-function may be a stand-alone function within the IWG service 601 or, alternatively, may be a portion or part of a larger function, procedure, or application specific interface in the IWG service 601.

Figure 7:
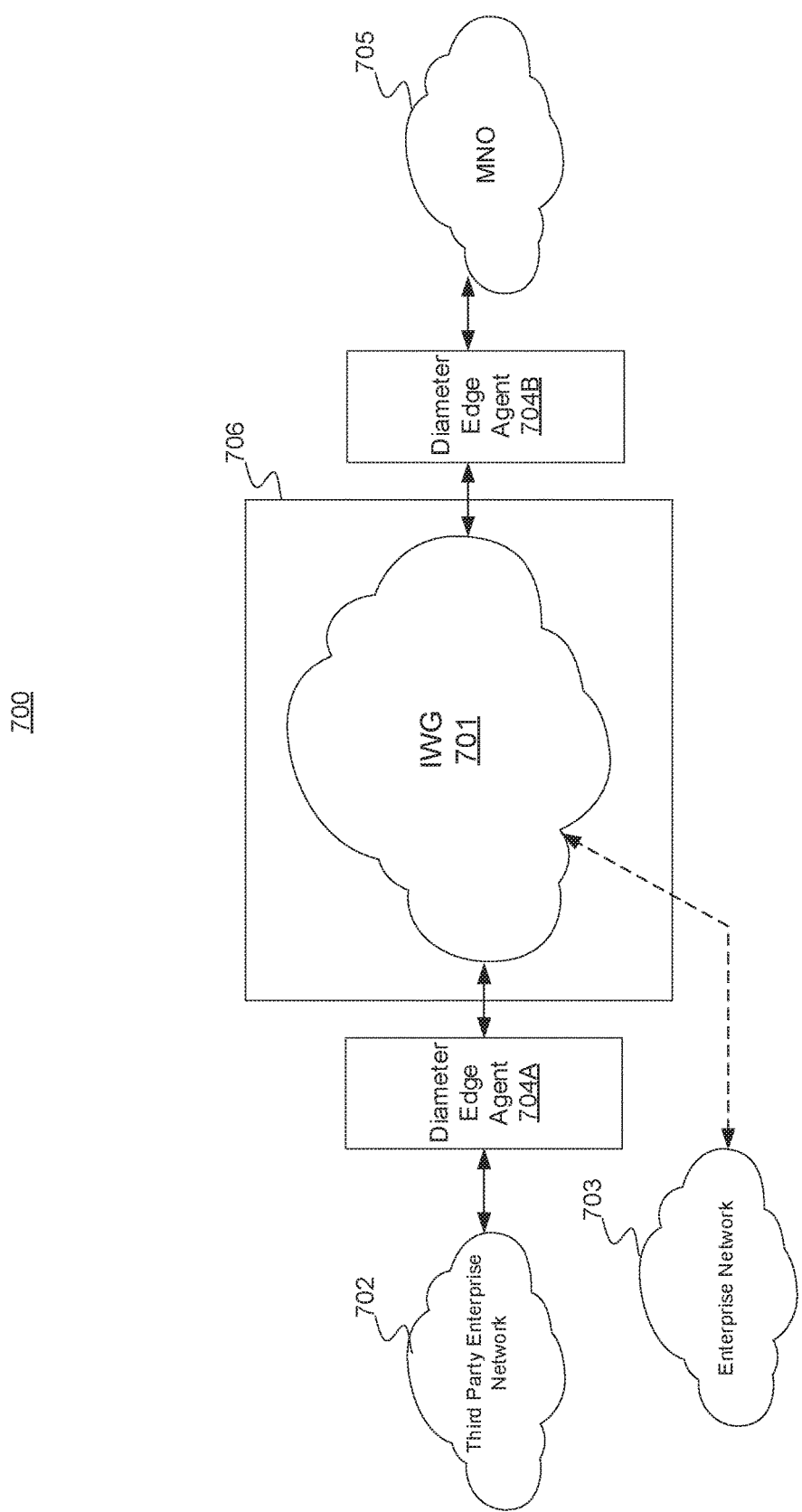
FIG. 7 is a schematic diagram of an exemplary network architecture including a cloud-based IWG service in communication with Diameter Edge Agents in accordance with certain illustrative embodiments described herein.

FIG. 7 illustrates an exemplary cloud-based architecture 700 including Diameter Edge Agents 704A and 704B coupled to an IWG 701 in accordance with certain disclosed embodiments. Diameter Edge Agent 704A may be configured to facilitate communications between the IWG 204 and one or more access networks, such as 3.5 GHz based enterprise networks 212. Diameter Edge Agent 704B may be configured to facilitate communications between the IWG 204 and one or more MNO networks 106. In some embodiments, for example, the cloud-based architecture 700 may comprise a Diameter Edge Agent 704A that may support HTTP or HTTPS interfaces coupled to one or more enterprise networks 703 and one or more third-party enterprise networks 702. In addition, the cloud-based architecture 700 may further comprise another Diameter Edge Agent 704B that may support legacy 3GPP interfaces for communications with one or more MNO networks 705.

In some embodiments, the Diameter Edge Agent 704A may be cloud-based, e.g., and communicate with the IWG service 701 using one or more cloud-based protocols, which may support dynamic scaling of the number network interfaces with the IWG service 701 for establishing communications between one or more enterprise networks 703 and one or more MNO networks 705. The cloud-based connection between Diameter Edge Agent 704A and the IWG service 701 is preferably configured to support hundreds or thousands of enterprise networks 703, where the number of enterprise networks may be dynamically changing. On the other hand, the Diameter Edge Agent 704B may maintain standard interfaces between the IWG service 701 and one or more MNO networks 705. In some embodiments, the IWG service 701 establishes significantly fewer (e.g., 3-5) connections to MNO networks 705 through the Diameter Edge Agent 704B than it establishes over its cloud-based interface with Diameter Edge Agent 704A. By logically separating the Diameter edges using a Diameter Edge Agent 704A on one side of the exemplary IWG service 701 in FIG. 7 and a different Diameter Edge Agent 704B on the other side of the IWG service 701, the exemplary network architecture 700 may be cloud-based and may enable the IWG service 701 to be scalable to support hundreds and thousands of 3.5 GHz networks interconnecting with one or more MNO networks 705.

In some embodiments, the IWG service 701 may cache and/or manipulate data at one or more of the Diameter Edge Agent 704A or Diameter Edge Agent 704B. When and where the IWG service 701 may decide to cache and/or manipulate data may be based on at least one of usage patterns, activity levels, types of data, or event-based triggers.

Figure 8:
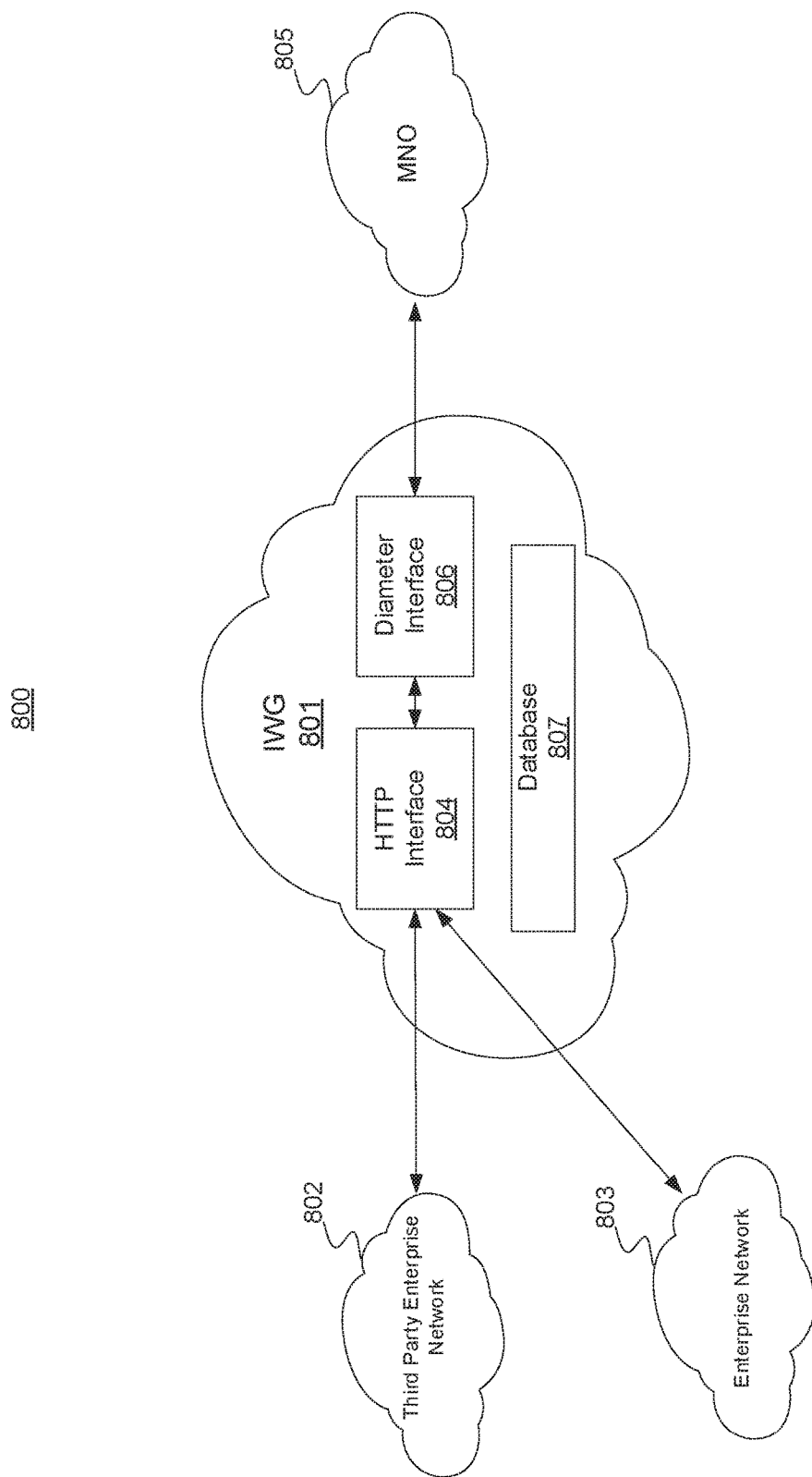
FIG. 8 is a schematic diagram of an exemplary network architecture including an HTTP interface and a Diameter interface in a cloud-based IWG service in accordance with certain illustrative embodiments described herein.

FIG. 8 illustrates an exemplary cloud-based architecture 800 including an HTTP interface 804 and a Diameter interface 806 within an IWG service 801 in accordance with certain disclosed embodiments. IWG service 801 may comprise at least one HTTP interface 804 configured to communicate with one or more access networks, such as 3.5 GHz based enterprise networks 212. IWG service 801 may further comprise at least one Diameter interface 806 configured to communicate with one or more MNO networks 106. In some embodiments, HTTP interface 804 may support HTTP or HTTPS communications with one or more enterprise networks 803 and one or more third-party enterprise networks 802. In some embodiments, the Diameter interface 806 may support legacy 3GPP interfaces for communications with one or more MNO networks 805.

In some embodiments, IWG service 801 may comprise a database 807 that stores information from HTTP interface 804 and/or Diameter interface 806. For example, database 807 may store state or context information for one or more network communication sessions. In some embodiments, the IWG service 801 may cache and/or manipulate data at one or more of the HTTP interface 804 or Diameter interface 806. When and where the IWG service 801 may decide to cache and/or manipulate data may be based on at least one of usage patterns, activity levels, types of data, or event-based triggers. HTTP interface 804 may be configured to support hundreds or thousands of enterprise networks 803, where the number of enterprise networks may be dynamically changing. On the other hand, Diameter interface 806 may maintain standard interfaces between the IWG service 801 and one or more MNO networks 805. In some embodiments, the IWG service 801 establishes significantly fewer (e.g., 3-5) connections to MNO networks 805 through Diameter interface 806 than it establishes over the HTTP interface 804. Further, by incorporating HTTP interface 804 and Diameter interface 806 in a cloud-based IWG service 801, the exemplary network architecture 800 may be cloud-based, enabling the IWG service 801 to be scalable to support hundreds or thousands of 3.5 GHz networks interconnecting with one or more MNO networks 805.

Because the IWG service, such as IWG service 701 or IWG service 801, may need to support hundreds or thousands of 3.5 GHz networks interconnecting with one or more MNO networks, there may be various ways to optimize the volume of signaling. For example, the IWG service may aggregate messages, cache information, such as credentials and policies, and/or group a plurality of 3.5 GHz networks signaling the one or more MNO networks. In some embodiments, the IWG service may group the 3.5 GHz networks based on at least one of business relationships among one or more 3.5 GHz networks, geographical locations of the 3.5 GHz networks, or user patterns associated with the 3.5 GHz networks. In other embodiments, the IWG service may provide an authentication function, policy function, and/or charging function only once for a group of 3.5 GHz networks that remains valid for a predetermined period of time, such that the IWG service, for example, does not need to authenticate each 3.5 GHz network each time the 3.5 GHz network sends a request to interconnect with an MNO network.

In some embodiments, the IWG service may comprise an Internet of Things (IoT) gateway type functionality through which the IWG service may represent a class of devices as one device to an MNO network. For example, the IWG service may present a single Subscriber Identity Module (SIM) that represents a whole class of devices to an MNO network. Each of the devices in the class may authenticate individually with the IWG service. However, the IWG may represent all of the devices in the class in an aggregated/unified way to the MNO network, such that if one device in the class of devices is authenticated by the MNO network, then the other devices in the class may not need to go through the authentication process to be authenticated by the MNO network. The IoT gateway type functionality may not need to be limited to SIM approaches. For example, the IWG service may provide the IoT gateway type functionality for 3.5 GHz networks interconnecting with one or more MNO networks. In such embodiments, the IWG service may group the 3.5 GHz networks and present one group of 3.5 GHz networks to an MNO network. In some embodiments, if one 3.5 GHz network in the group is authenticated by the MNO network, then the other 3.5 GHz networks in the group may not need to be individually authenticated by the MNO network.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and techniques consistent with the present disclosure may be implemented as hardware alone. Additionally, the disclosed embodiments are not limited to the examples discussed herein. In accordance with additional embodiments of the present disclosure, a computer-readable medium is disclosed that stores instructions that, when executed by a processor(s), causes the processor(s) to perform operations consistent with one or more disclosed methods.

Computer programs based on the written description and methods of this specification are within the skill of a software developer. The various programs or program modules may be created using a variety of programming techniques. For example, program sections or program modules may be designed in or by means of Java, C, C++, assembly language, or any such programming languages. One or more of such software sections or modules may be integrated into a computer system, non-transitory computer-readable media, or existing communications software.

While illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with the true scope and spirit being indicated by the following claims and their full scope of equivalents.

What is claimed is:

1. A method for interconnecting a plurality of networks, including at least one first network with at least two second networks via an interworking gateway (IWG), the method comprising:
   (a) receiving, by the IWG, a request from the at least one first network for the at least one first network to interconnect with the at least two second networks, wherein the request to interconnect with the at least two second networks is initiated by the at least one first network;
   (b) determining, by the IWG, at least one criteria associated with the at least two second networks to enforce in the at least one first network; and
   (c) enforcing, by the IWG, the at least one criteria for communications between the at least one first and at least two second networks,
   wherein the IWG is a cloud-based service that is configured to dynamically change a number of networks, wherein the number of networks comprises at least three networks interconnected with one another.

2. The method of claim 1, wherein the at least one first network comprises a 3.5 GHz based Citizens Broadband Radio Service (CBRS) network.

3. The method of claim 1, wherein a second network comprises a mobile network operator (MNO) network.

4. The method of claim 1, further comprising determining a validity of the at least one first network, wherein determining the validity of the at least one first network comprises determining at least one of network capability or network planning associated with the at least one first network.

5. The method of claim 4, further comprising requesting, from the at least two second networks, an authorization for the at least one first network to interconnect with the at least two second networks based on at least one of network capability or network planning associated with the at least one first network.

6. The method of claim 1, wherein the at least one criteria comprises at least one of attribute value pairs (AVP) content, quality of service (QoS), location, or an IP address associated with the at least two second networks.

7. The method of claim 1, further comprising determining a service level agreement (SLA) associated with the at least one first network.

8. The method of claim 1, further comprising automatically generating a service level agreement (SLA) associated with the at least one first network upon receiving the request for the at least two second networks to interconnect with the at least one first network.

9. The method of claim 7, wherein the at least one SLA comprises at least one of a service expectation requested by the at least two second networks or a requirement that the first network expects from the at least two second networks.

10. The method of claim 9, wherein the at least one SLA comprises at least one of a type of service requested, a QoS requested, a billing requirement, a time of service requested, a location of service requested, a date of service requested, service availability, or a security of service.

11. The method of claim 1, wherein the IWG comprises a first Diameter Edge Agent configured to facilitate communications between the IWG and the at least two second networks, and a second Diameter Edge Agent configured to facilitate communications between the IWG and the at least one first network.

12. The method of claim 1, wherein the IWG comprises a first interface configured to facilitate communications between the IWG and the at least two second networks according to a first protocol, and further comprises a second interface configured to facilitate communications between the IWG and the at least one first network according to a second protocol.

13. The method of claim 12, wherein the first interface is configured to communicate using a web-based protocol and the second interface is configured to communicate using a Diameter protocol.

14. The method of claim 1, further comprising:
receiving, from a second network, a request to monitor the at least one first network; and
providing, to the second network, at least one of a key performance indicator (KPI) report, a metric evaluation, a network health assessment, or a network security assessment based on monitoring the at least one first network.

15. An interworking gateway (IWG) for interconnecting a plurality of networks, including at least two second networks, with at least one first network, the IWG configured to:
(a) receive, from the at least one first network, a request for the at least two second networks to interconnect with the at least one first network, wherein the request to interconnect with the at least two second networks is initiated by the at least one first network;
(b) determine at least one criteria associated with the at least two second networks to enforce in the at least one first network; and
(c) enforce the at least one criteria for communications between the at least one first and at least two second networks,
wherein the IWG is a cloud-based service that is configured to dynamically change a number of networks, wherein the number of networks comprises at least three networks interconnected with one another.

16. The IWG of claim 15, wherein the at least one first network comprises a 3.5 GHz based Citizens Broadband Radio Service (CBRS) network.

17. The IWG of claim 15, wherein a second network comprises a mobile network operator (MNO) network.

18. The IWG of claim 15, wherein the IWG is further configured to determine a validity of the at least one first network, wherein determining the validity of the at least one first network comprises determining at least one of network capability or network planning associated with the at least one first network.

19. The IWG of claim 18, wherein the IWG is further configured to request, from the at least two second networks, an authorization for the at least one first network to interconnect with the at least two second networks based on the at least one of network capability or network planning associated with the at least one first network.

20. The IWG of claim 15, wherein the at least one criteria comprises at least one of attribute value pairs (AVP) content, quality of service (QoS), location, or an IP address associated with the at least two second networks.

21. The IWG of claim 15, wherein the IWG is further configured to determine a service level agreement (SLA) associated with the at least one first network.

22. The IWG of claim 15, wherein the IWG is further configured to automatically generate a service level agreement (SLA) associated with the at least one first network upon receiving the request for the at least two second networks to interconnect with the at least one first network.

23. The IWG of claim 21, wherein the at least one SLA comprises at least one of a service expectation requested by the at least two second networks or a requirement that the at least one first network expects from the at least two second networks.

24. The IWG of claim 23, wherein the at least one SLA comprises at least one of a type of service requested, a QoS requested, a billing requirement, a time of service requested, a location of service requested, a date of service requested, service availability, or a security of service.

25. The IWG of claim 15, wherein the IWG comprises a first Diameter Edge Agent configured to facilitate communications between the IWG and the at least two second networks, and a second Diameter Edge Agent configured to facilitate communications between the IWG and the at least one first network.

26. The IWG of claim 15, wherein the IWG comprises a first interface configured to facilitate communications between the IWG and the at least two second networks according to a first protocol, and further comprises a second interface configured to facilitate communications between the IWG and the at least one first network according to a second protocol.

27. The IWG of claim 26, wherein the first interface is configured to communicate using a web-based protocol and the second interface is configured to communicate using a Diameter protocol.

28. The IWG of claim 15, wherein the IWG is further configured to:
receive, from a second network, a request to monitor the at least one first network; and
provide, to the second network, at least one of a key performance indicator (KPI) report, a metric evaluation, a network health assessment, or a network security assessment based on monitoring the at least one first network.

29. A system for interconnecting a plurality of networks, including at least two second networks, with at least one first network, the system comprising:
an interworking gateway (IWG) configured to communicate with the at least two second networks and the at least one first network;
a processor;
at least one memory storing instructions for execution by the processor, wherein the instructions, when executed, implement the IWG that is configured to:
(a) receive, from the at least one first network, a request for the at least one first network to interconnect with the at least two second networks, wherein the request to interconnect with the at least two second networks is initiated by the at least one first network;
(b) determine at least one criteria associated with the at least two second networks to enforce in the at least one first network; and
(c) enforce the at least one criteria for communications between the at least two second and at least one first networks,
wherein the IWG is a cloud-based service that is configured to dynamically change a number of networks, wherein the number of networks comprises at least three networks interconnected with one another.

30. The system of claim 29, wherein the at least one first network comprises a 3.5 GHz based Citizens Broadband Radio Service (CBRS) network.

31. The system of claim 29, wherein a second network comprises a mobile network operator (MNO) network.

32. The system of claim 29, wherein the IWG is further configured to determine a validity of the at least one first network, wherein determining the validity of the at least one first network comprises determining at least one of network capability or network planning associated with the at least one first network.

33. The system of claim 32, wherein the IWG is further configured to request, from the at least two second networks, an authorization for the at least one first network to interconnect with the at least two second networks based on the at least one of network capability or network planning associated with the at least one first network.

34. The system of claim 29, wherein the at least one criteria comprises at least one of attribute value pairs (AVP) content, quality of service (QoS), location, or an IP address associated with the at least two second networks.

35. The system of claim 29, wherein the IWG is further configured to determine a service level agreement (SLA) associated with the at least one first network.

36. The system of claim 29, wherein the at least one SLA comprises at least one of a service expectation requested by the at least two second networks or a requirement that the at least one first network expects from the at least two second networks.

37. The system of claim 35, wherein the at least one SLA comprises at least one of a service expectation requested by the at least two second networks or a requirement that the at least one first network expects from the at least two second networks.

38. The system of claim 37, wherein the at least one SLA comprises at least one of a type of service requested, a QoS requested, a billing requirement, a time of service requested, a location of service requested, a date of service requested, service availability, or a security of service.

39. The system of claim 29, wherein the cloud-based interworking gateway service is further configured to:
receive, from a second network, a request to monitor the at least one first network; and
provide, to the at least two second networks, at least one of a key performance indicator (KPI) report, a metric evaluation, a network health assessment, or a network security assessment based on monitoring the at least one first network.

40. The system of claim 29, wherein the IWG further comprises at least one of an IWG administration function, an IWG SLA subsystem, an IWG signaling function, a Diameter Relay Agent, or a network management function.

41. The system of claim 29, wherein the IWG comprises a first Diameter Edge Agent configured to facilitate communications between the IWG and the at least two second networks, and a second Diameter Edge Agent configured to facilitate communications between the IWG and the at least one first network.

42. The system of claim 41, wherein at least one of the first Diameter Edge Agent or the second Diameter Edge Agent is cloud-based.

43. The system of claim 29, wherein the IWG comprises a first interface configured to facilitate communications between the IWG and the at least two second networks according to a first protocol, and further comprises a second interface configured to facilitate communications between the IWG and the at least one first network according to a second protocol.

44. The system of claim 43, wherein the first interface is configured to communicate using a web-based protocol and the second interface is configured to communicate using a Diameter protocol.

45. The method of claim 1, wherein the IWG is further configured to maintain standard interfaces between each of the plurality of networks and the at least one first network.

46. The IWG of claim 15, wherein the IWG is further configured to maintain standard interfaces between each of the plurality of networks and the at least one first network.

47. The system of claim 29, wherein the IWG is further configured to maintain standard interfaces between each of the plurality of networks and the at least one first network.

\* \* \* \* \*